June 5, 1945. T. R. SMITH 2,377,819
WRINGER CONSTRUCTION
Filed Jan. 5, 1940 3 Sheets-Sheet 1
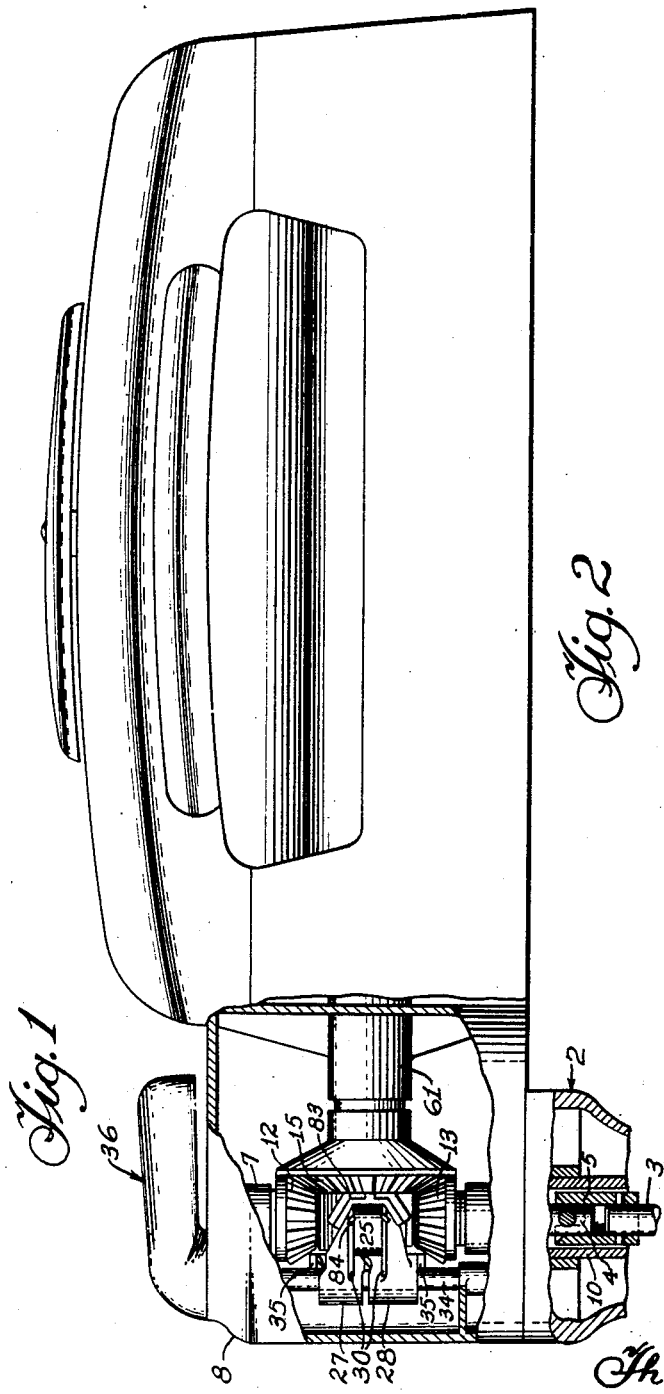
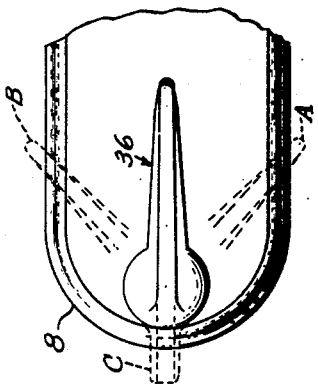
Inventor:
Thomas R. Smith,
By Parkinson Lane
Attorneys.

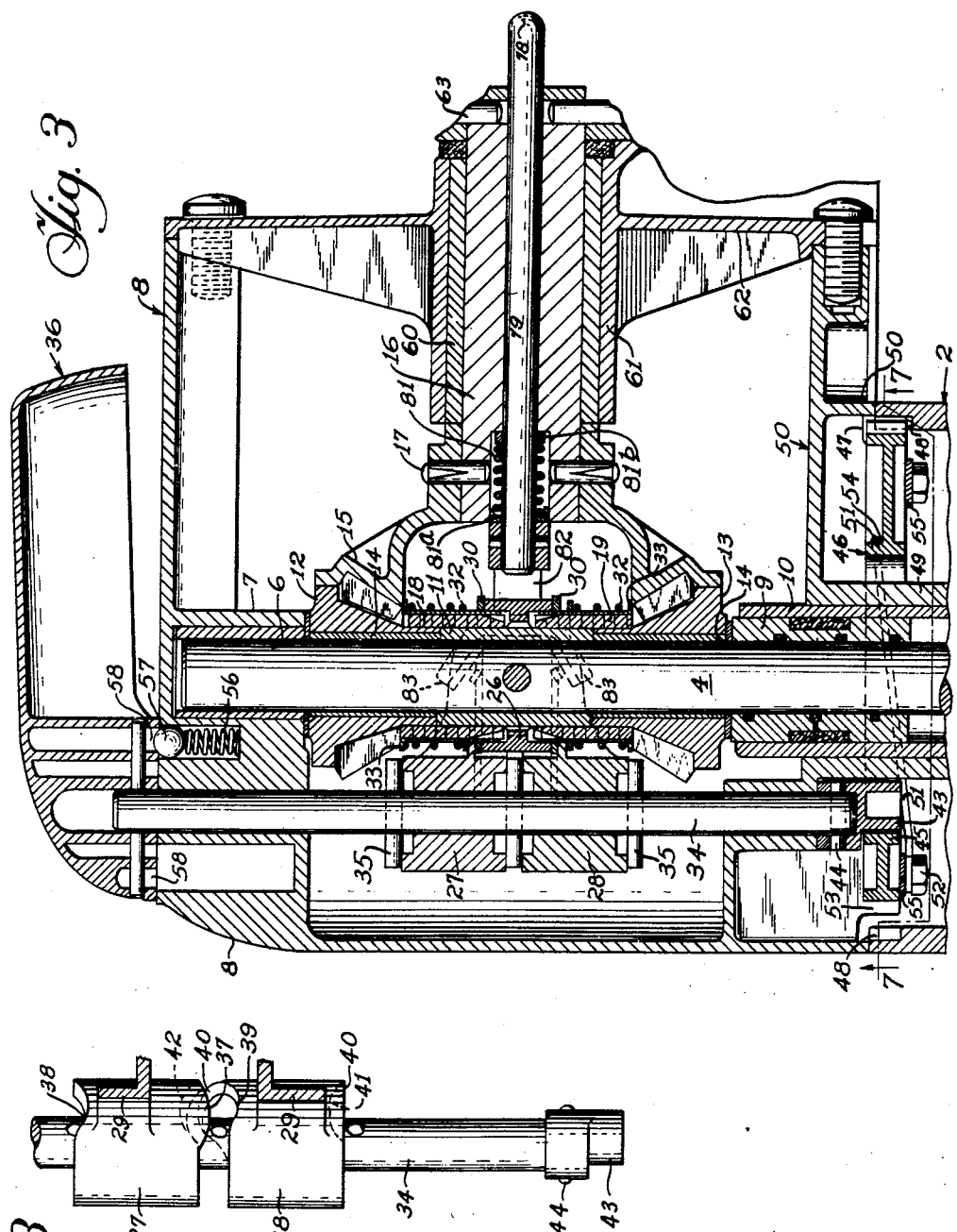

June 5, 1945.  T. R. SMITH  2,377,819
WRINGER CONSTRUCTION
Filed Jan. 5, 1940  3 Sheets—Sheet 3
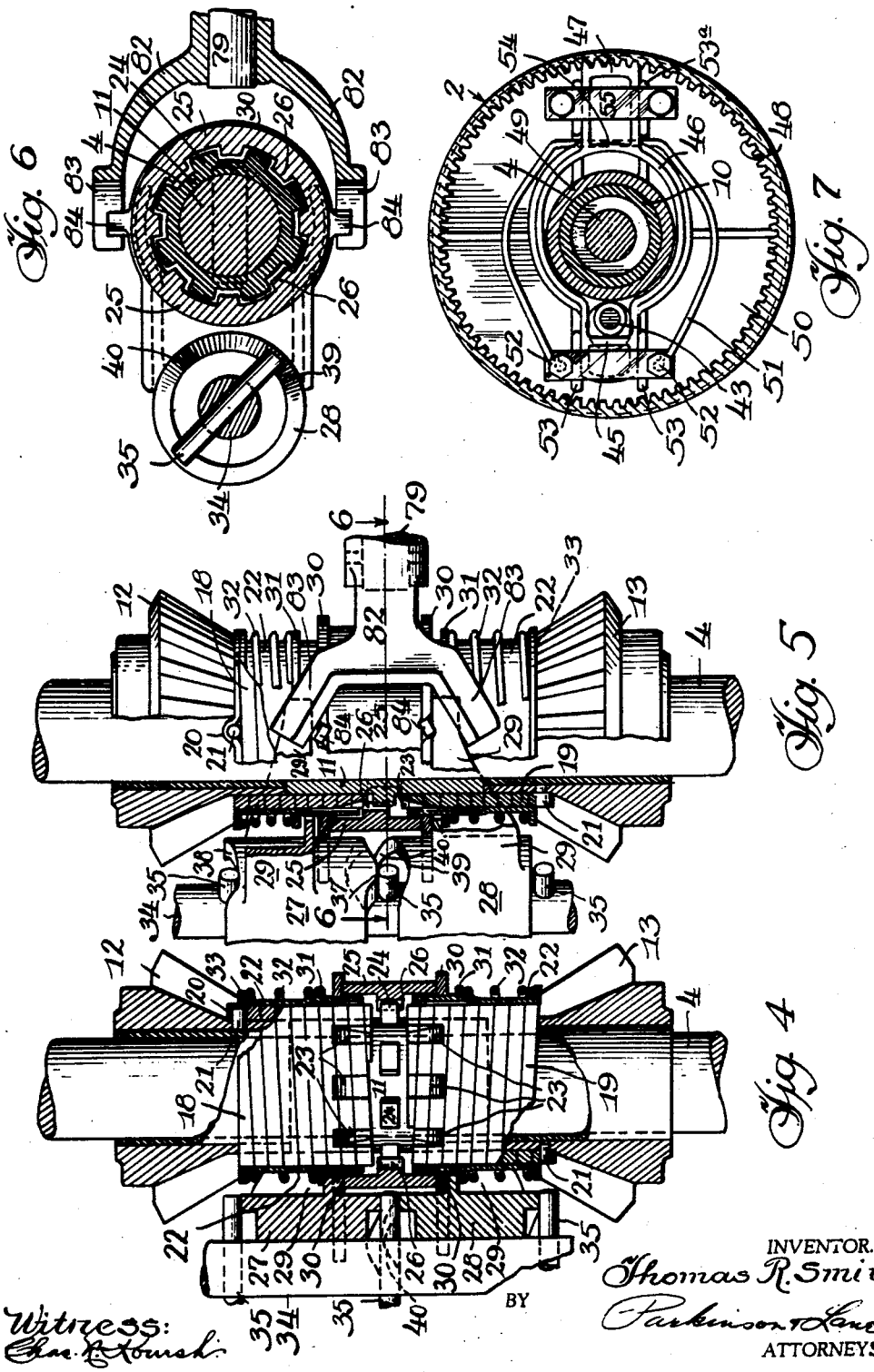
INVENTOR.
Thomas R. Smith
BY Parkinson & Lane
ATTORNEYS Patented June 5, 1945

2,377,819

UNITED STATES PATENT OFFICE 2,377,819

WRINGER CONSTRUCTION

Thomas R. Smith, Newton, Iowa, assignor to The Maytag Company, Newton, Iowa, a corporation of Delaware Application January 5, 1940, Serial No. 312,556

19 Claims. (Cl. 68—255)

The present invention relates to a wringer construction and more particularly to such a construction affording the housewife optimum safety, convenience and efficiency in wringing her clothes. In the wringing operation, the housewife successively wrings the garments taken from the washing machine, after the washing operation has been completed, into one or more rinse tubs and from the rinse into a bluing tub, and thereafter into a basket or other receptacle prior to hanging the garments upon a line or rack to dry.

In order that these successive operations may be quickly, conveniently and safely accomplished, the present novel construction embodies a power driven, swinging wringer in which the power drive is at all times under the positive control of the operator. Reference is hereby made to applicant's co-pending divisional applications Serial Nos. 399,367, and 399,368, filed June 23, 1941.

In the present novel embodiment of wringer construction, driving connection between the vertical wringer drive shaft and the roll shaft is accomplished by means of a novel drive mechanism including a pair of clutch springs. In the illustrated embodiment, when the wringer drive mechanism is in neutral position, these clutch springs loosely encompass a drive collar keyed to the vertical drive shaft intermediate a pair of opposed bevel gears or pinions loose upon this shaft, the gears or pinions being in continuous meshing engagement with a bevel gear or pinion pinned or keyed to the horizontal roll drive shaft. One end of each clutch spring is affixed to its respective opposed pinion and the opposite end is adapted to be clutched to the drive collar and vertical drive shaft in such manner as to drive its respective pinion and the wringer roll shaft in the desired direction of rotation. This construction and arrangement is positive in operation and provides a novel power drive for the wringer in which the clutch springs and associated parts form a torque amplifier unit that is initiated by the single lever and requires but finger-tip control. This relieves the housewife of the manual effort previously required in operating the wringer.

The invention further relates to a novel construction of indexing mechanism whereby the swinging wringer can be moved to any desired position about its vertical pivot or axis and locked solidly in such adjusted position until the operator desires to move the wringer to a new position of adjustment. The present wringer constructions now in commercial use are provided with spaced indexing notches or openings in the stationary wringer support for receiving an indexing pin carried by the wringer head. Due to the spacing of the notches or openings, the operator is limited in the number of indexing positions in which the wringer can be locked or latched against swinging movement. In the present novel construction, the indexing mechanism comprises an internal gear formed in the stationary wringer support secured to the washing machine tub, and a shiftable gear segment carried by the wringer and actuated by the single control handle pivotally mounted upon the top of the wringer gear housing.

Further objects are to provide a construction of maximum simplicity, efficiency, economy and ease of assembly and operation, and such further objects, advantages and capabilities as will later more fully appear and are inherently possessed thereby.

The invention further resides in the construction, combination and arrangement of parts illustrated in the accompanying drawings, and while I have shown therein a preferred embodiment, it is to be understood that the same is susceptible of modification and change, and comprehends other details, arrangements of parts, features and constructions without departing from the spirit of the invention.

In the drawings:

Fig. 1 is a view in vertical cross section through the wringer head construction.

Fig. 2 is a plan view of the wringer head construction.

Fig. 3 is a fragmentary enlarged view in vertical cross section taken longitudinally through the wringer drive mechanism.

Figs. 4 and 5 are fragmentary enlarged views, part in vertical cross section and part in side elevation, of the torque amplifier unit including the spring clutches and mechanism for clutching and de-clutching the wringer drive mechanism for rotating the rolls.

Fig. 6 is a view in horizontal cross section taken on the line 6—6 of Fig. 5.

Fig. 7 is a view in horizontal cross section taken in a plane represented by the line 7—7 of Fig. 3 and showing the wringer indexing mechanism.

Fig. 8 is a view in side elevation of the shifter shaft and cams for actuating the clutching and indexing mechanism, but with the actuating fingers and pins removed in order to more clearly illustrate the cam faces.

Referring more particularly to Figs. 1 and 2 of the drawings, the swinging wringer is shown as rotatably mounted upon a wringer post or support 2 secured to and positioned at one side or corner of a washing machine tub. The wringer is adapted to swing in a complete circumference so that the operator, after the washing operation, may wring the garments into successive rinse and bluing tubs in a manner well known, and is readily removable from the post or support 2 upon which it is swingably mounted, should the occasion arise.

Power is supplied to the wringer by means of a vertical drive shaft 3 to which an aligned upper wringer shaft 4 is coupled at 5 when the wringer is mounted in operative position. As clearly shown in Fig. 3, the upper shaft 4 is centered and rotatably mounted in an upper bearing 6 pressed into a boss 7 in the wringer gear housing 8, and a lower bushing 9 pressed into a tubing 10 for the wringer stem. A drive collar 11 is suitably pinned to the shaft 4 and opposed bevel gears or pinions 12 and 13, each shown as pressed upon a sleeve 14, are rotatably mounted upon this shaft and maintained in continuous meshing engagement with a large bevel gear or pinion 15 pinned to a roll drive shaft 16 by means of a groove pin or key 17.

As clearly shown in Figs. 3, 4 and 5, in order to clutch either of the opposed pinions 12 or 13 to the drive shaft 4, the invention comprehends a novel clutching arrangement and torque amplifier unit including a pair of clutch springs 18 and 19, the right hand drive spring 18 encompassing the hub of the pinion 12 with its upper end deformed to provide a raised loop at 20 and anchored to the pinion by means of a pin 21. This raised loop and pin seat between the ends of two adjacent teeth on the pinion 12 whereby the spring and pinion are held in solid engagement. The left hand drive spring 19 is secured to the pinion 13 in a similar manner. Each spring is of coil construction, substantially rectangular in cross section and freely encompasses the drive collar 11 which is keyed to and rotates with the shaft 4, but each is held onto its respective pinion by an enclosing sleeve 22. This provides a pressed fit assembly so that each pinion, its respective clutch or drive spring and enclosing sleeve form a unit assembly. In neutral position, the right and left hand drive springs turn freely on the drive collar 11.

The inner or adjacent ends of the clutch or drive springs 18 and 19 are provided with spaced vertically extending notches 23 and the drive collar 11 is formed with external splines 24 adapted to mesh with and rotate a surrounding slidable drive sleeve 25 having internal splines 26, as shown more clearly in Fig. 6 of the drawings. The drive sleeve is shifted up or down by means of a pair of spaced cams 27 and 28, each having a pair of projecting fingers 29 adapted to engage a nonrotatable collar or plate 30. One of these collars or plates 30 is loosely mounted at each end of the drive sleeve 25, so that each collar or plate 30 is disposed between an end of the drive sleeve and a finger 29. A washer 31 is disposed at the opposite face of each finger 29 for engagement by the inner end of a coil spring 32, the opposite or outer end of these coil springs seating against an external flange 33 formed on the outer end of each enclosing sleeve 22.

The cams 27 and 28 (see Figs. 3, 4, 5 and 8) are shifted up or down upon a rotatable shifter shaft 34 by means of spaced pins 35 secured in the shifter shaft to rotate therewith. The opposite faces or ends of these cams are so shaped or contoured that when the control handle 36, to which the shifter shaft is pinned, is rotated from its fingers 29, washer 31 and the lower coil spring in a clockwise direction through approximately 45° to the dotted line position A shown in this figure, the upper cam 27 is raised (see Figs. 5 and 8) by the intermediate pin 35 engaging the projection or swell 37 on the lower face of this cam, and the uppermost pin seats in the depression or dwell 38 in the upper face. Raising of this cam 27 carries along its projecting fingers 29 which in turn raise the upper washer 31 and compress the upper coil spring 32. At the same time, this intermediate pin 35 is positioned directly above the dwell or depressed portion 39 of the upper face of the lower cam 28 so that the lower coil spring 32 expands and raises its washer 31, fingers 29 and cam 28, and these fingers raise the lower collar or plate 30 which in turn raises the drive sleeve 25 and forces its splines into meshing engagement with the notches 23 in the end of the clutch drive spring 18. This engagement with the drive spring causes the spring to wind up and grip the surface of the drive collar 11, causing the load to be transmitted from this drive collar to the spring and from the spring to the drive pinion 12, thereby causing rotation of the bevel gear 15 and roll drive shaft 16 in the direction as indicated by the shift.

In the same manner, rotation of the single control handle 36 to the dotted line position B (i. e. approximately 45° in a counter-clockwise direction from the neutral position shown in full lines in Fig. 2) causes the intermediate pin 35 to engage the swell or projection 40 on the face of the lower cam 28 whereby to depress this cam, its fingers 29, washer 31 and the lower coil spring 32. In this position, the dwell or depression 41 in the lower face of the cam 28 is engaged by the lowermost pin 35 and the intermediate pin 35 is positioned directly below but spaced from the dwell or depression 42 in the lower cam face of the upper cam 27. In this position, the upper coil spring 32 expands and as the upper cam 27 is free to move downwardly, this spring depresses its washer 31, fingers 29 and upper cam 27, thereby forcing the shiftable, rotating drive sleeve 25 downwardly until its splines 26 mesh with the notches 23 in the lower drive or clutch spring 19. This engagement causes the clutch spring to wind up and grip the surface of the drive collar and thereby cause the load to be transferred from this drive collar to the spring 19 and from the spring to the drive pinion 13 so as to cause rotation of the bevel gear 15 and roll shaft 16 in the direction opposite to that above described.

In order that the swinging wringer may be latched or indexed in any desired position, the invention comprehends a novel indexing mechanism which permits the operator to swing the wringer through a complete circumference or through any desired angle or arc, and thereat positively lock the wringer solidly in position (see Figs. 3 and 7). The indexing is accomplished through an indexing cam 43 located at the lower end of the shifter shaft 34 and pinned thereto at 44, and the wringer can be disengaged only when this shifter shaft and its control handle 36 are rotated through approximately 180° from the neutral position shown in full lines in Fig. 2 to the dotted line position at C. It is, therefore, impossible for the wringer to be disengaged and in gear at the same time as the only positions in which the wringer is in gear are when the control handle is moved to a position approximately 45° in either direction from a central or neutral position, and when moved beyond that angle, the wringer is taken out of gear.

When the shifter handle and shaft 34 are turned 180° from the neutral position shown in Figs. 2 and 7, the indexing cam operates against a bar or cross piece 45 on the indexing slide 46 in such manner that this indexing slide is retracted and this in turn withdraws the gear segment 47 formed on or carried by the slide from its meshing and locking engagement with the internal gear teeth 48 formed in the upper portion of the stationary wringer support 2. In the disclosed embodiment, this indexing slide loosely encompasses the projecting collar 49 of the base 50 of the wringer gear housing 8 so as to permit this slide to be shifted by the indexing cam to a withdrawn position, and to be moved and held in indexing or latching position by a looped spring 51 anchored at its opposite ends to the bolts or studs 52 secured upon guide members 53 formed integral with the base 50. The central portion of the spring is anchored in the slide at 54 so as to normally force the slide outwardly and hold its gear segment 47 in meshing engagement with the teeth 48 in the stationary support. The guides 53 and similar guides 53a, along with the plates 55, retain the slide in operative position. In order to hold or index the positions of the wringer control and shifter handle, the upper portion or head of the wringer gear housing 8 is provided with a coil spring 56 exerting pressure against an index ball 57 to force this ball into spaced notches or depressions 58 in the under surface of the control handle. It will thus be apparent from Figure 2 that the control handle has predetermined angular locations or regions in one of which (position A) the wringer is in gear and the roll drive operates in one direction with the wringer locked against swinging movement, in another (position B) in which the roll drive operates in the opposite direction with the wringer locked against swinging movement, in another (position shown in full lines in Figure 2) in which the roll drive is in neutral with the wringer locked against swinging movement, and in still another (position C) in which the roll drive is in neutral and with the wringer unlocked to allow it to be swung to any desired location.

A roll stop plunger 79 having an outer end 78 is provided at its inner end with bifurcations 82 (see Fig. 6), the projections or arms 83 of which are so formed as to engage the ears 84 formed on the collars or plates 30, whenever the plunger is forced inwardly against the tension of the spring 81. This inward movement causes either arm or projection 83 to engage the ears 84 of one or the other of the collars 30, depending upon whichever one has been moved in the clutching operation, and to move this collar and the drive sleeve 25 to a neutral position, thereby disengaging whichever driving spring 18 or 19 is in clutching engagement. Thus the drive to the wringer rolls will be instantly disengaged, regardless of the position of the control handle or shifter cams.

I claim:

1. In a swinging wringer for a washing machine, mechanism for indexing the wringer in any desired position with respect to the machine, comprising a stationary support about whose axis the wringer swings, gear teeth formed on the inner circumference of the support a horizontally disposed spring-pressed gear segment slidably mounted in the wringer adapted to move in a horizontal plane to mesh with the teeth in the support for locking the wringer in indexed position, and means for withdrawing said segment and unlocking the wringer from its indexed position.

2. In a power operated swinging wringer for a washing machine, indexing mechanism for locking the wringer against swinging movement and comprising a stationary support associated with the washing machine and provided with internal indexing teeth, and a horizontally disposed spring-actuated retractable gear segment adapted to be moved in a horizontal plane into and out of mesh with the teeth in the support and when in mesh, locking the wringer solidly against swinging movement in either direction, and when taken out of mesh, releasing the wringer for swinging movement about the axis of the support, and means for retracting the gear segment from meshing engagement to permit swinging of the wringer.

3. In a power operated swinging wringer for a washing machine, indexing mechanism for locking the wringer against swinging movement and comprising a stationary wringer post secured to the machine and providing a support and pivotal mounting for the swinging of the wringer, indexing teeth provided in the wringer post, a spring-actuated gear segment carried by the wringer and positioned within the wringer post adapted to move in a horizontal plane into mesh with the indexing teeth to lock the wringer in any desired position for the wringing operation, and cam means engaging the gear segment for retracting the gear segment from meshing engagement to permit swinging of the wringer.

4. In a swinging wringer for a washing machine, mechanism for indexing the wringer in desired positions with respect to the machine, drive mechanism adapted to be shifted into neutral position in which the rolls are maintained stationary or into driving relation for rotating the rolls in either direction, a shaft having means intermediate its ends for controlling the drive mechanism, means adjacent one end of the shaft for controlling the indexing mechanism, and a single handle for actuating the shaft and rotatable in a single plane for initiating the indexing and shifting operations, said control handle having predetermined angular regions for roll drive in one direction with wringer locked to prevent swinging, roll drive in opposite direction with wringer locked to prevent swinging, roll drive in neutral with wringer locked to prevent swinging, and roll drive in neutral with wringer unlocked to allow swinging, said control handle, indexing and drive mechanism being so constructed and arranged as to prevent said angular regions from overlapping.

5. In a power operated swinging wringer for a washing machine, indexing mechanism for locking the wringer in any desired position against swinging movement with respect to the washing machine, comprising a stationary support having internal gear teeth spaced throughout its inner periphery, a spring pressed horizontally disposed and slidably mounted retractable gear segment adapted to move in a horizontal plane into mesh with the gear teeth and when in mesh with the teeth in the support to retain the wringer in locked position, and means for retracting said segment to unlock the wringer and permit its swinging movement.

6. In a power operated swinging wringer for a washing machine, indexing mechanism for locking the wringer against swinging movement and comprising a stationary wringer post secured to the machine and providing a support and pivotal mounting for the swinging of the wringer, a horizontally disposed retractable member carried by the wringer and disposed within the wringer post, complementary teeth in the wringer post and retractable member which, when the retractable member is moved in a horizontal plane into meshing engagement with the teeth, lock the wringer against swinging movement in either direction, and when out of mesh, permit the wringer to swing freely about its pivotal axis.

7. In a power operated swinging wringer for a washing machine, indexing mechanism for locking the wringer against swinging movement and comprising a stationary wringer post secured to the machine and providing a support and pivotal mounting for the swinging of the wringer, a horizontally disposed and spring-pressed retractable member carried by the wringer, complementary teeth in the wringer post and retractable member which, when the retractable member is moved in a horizontal plane into meshing engagement with the teeth, lock the wringer against swinging movement, and when out of mesh, permit the wringer to swing freely about its pivotal axis, and a control handle having a cam surface adapted to withdraw the retractable member from meshing engagement.

8. In a power operated swinging wringer for a washing machine, indexing mechanism for locking the wringer against swinging movement and comprising a stationary wringer support upon which the wringer is pivotally mounted, a horizontally disposed, retractable spring-pressed indexing slide carried by the wringer within the wringer support, complementary teeth in the wringer support and slide which, when the slide is moved in a horizontal plane into meshing engagement with the teeth on the support, lock the wringer against swinging movement, a shifter shaft having a cam surface engaging and moving the slide into retracted position, and an operator's handle for rotating the shaft and cam to unlock the wringer.

9. In a swinging wringer for a washing machine, mechanism for indexing the wringer in desired positions with respect to the machine, drive mechanism adapted to be shifted into neutral position in which the rolls are maintained stationary or into driving relation for rotating the rolls in either direction, a vertical shaft having means intermediate its ends for controlling the drive mechanism, a cam fixed upon one end of the shaft and rotatable therewith for controlling the indexing mechanism and a single handle adjacent its other end, said handle being rotatable in a single horizontal plane for initiating the indexing and shifting operations and thereby providing positional control of the wringer, said handle, indexing and shifting mechanism being so constructed and arranged that the handle may be moved from a position for rotating the rolls to a position retracting and positively releasing the indexing mechanism without changing its plane of motion.

10. In a swinging wringer for a washing machine, mechanism for indexing the wringer in desired positions with respect to the machine, drive mechanism adapted to be shifted into neutral position in which the rolls are maintained stationary or into driving relation for rotating the rolls in either direction, a shaft having means intermediate its ends for controlling the drive mechanism, a cam fixed on one end of the shaft and rotatable therewith for controlling the indexing mechanism, and a single handle adjacent its other end rotatable in a single plane of movement affording finger-tip control of the indexing and shifting operations.

11. In a clutch construction, drive mechanism including a drive shaft, opposed pinions rotatable upon the drive shaft but adapted to be clutched thereto, a drive member rotatable with the drive shaft, a driven shaft having a gear in continuous mesh with and adapted to be driven by either of the pinions, a clutch spring associated with each pinion and having one end anchored to the pinion and the other end free, splines provided in the free end of each spring, and manually shiftable means for clutching the drive member with the splined end of either clutch spring to wind up and drive said spring and its respective pinion and meshing gear for rotating the driven shaft in the desired direction.

12. In a clutch construction, a power drive shaft, opposed pinions rotatable on the shaft but adapted to be clutched thereto, a driven shaft having a gear mounted on and in mesh with the pinions, a drive collar fixed to the drive shaft, a clutch spring associated with each pinion and having one end anchored to the pinion and the other end freely encompassing the drive collar, a drive sleeve splined to but slidable on the drive collar, splines on the free ends of the springs, and means for shifting the drive sleeve on the drive collar and into splined engagement with the splined end of one of said springs so as to cause said spring to wind up and grip the drive collar and drive the driven shaft through the drive collar, drive sleeve, spring, pinion and gear and rotate this shaft in the desired direction.

13. In a clutch construction, a power drive shaft, opposed pinions rotatable on the shaft but adapted to be clutched thereto, a driven shaft having a gear mounted on and in meshing engagement with the pinions and adapted to be driven in either direction, a drive collar secured to the drive shaft between the opposed pinions, a coil clutch spring associated with each pinion and having an end anchored to the pinion and the other end free and encompassing the drive collar, a sleeve concentric with the drive collar and splined thereto but shiftable on the collar, splines on the free end of each clutch spring complementary to those on the sleeve so that when the sleeve is moved in either direction from its central or neutral position, its splines engage those on the respective clutch spring causing this spring to wind up and grip the drive collar and drive its respective pinion and the gear, and means for shifting the drive sleeve into and out of splined engagement with the clutch springs.

14. In a clutch construction, a power drive shaft, opposed pinions rotatable on the shaft but adapted to be clutched thereto, a driven shaft having a gear mounted on and in mesh with the pinions, a drive collar keyed to the drive shaft, a clutch spring associated with each pinion and having one end anchored to the pinion and the other end freely encompassing the drive collar, a drive sleeve splined to but slidable on the drive collar, splines on the free ends of the springs, and a cam initiated control for shifting the drive sleeve on the drive collar and into splined engagement with the splined end of one of said springs so as to cause said spring to wind up and grip the drive collar and drive the driven shaft.

15. In a clutch construction, a power drive shaft, opposed pinions rotatable on said shaft but adapted to be clutched thereto, a driven shaft having a gear mounted on and in meshing engagement with the pinions, a drive collar secured to the drive shaft between the opposed pinions, a coil clutch spring associated with each pinion and having an end anchored to the pinion and the other end free and encompassing the drive collar, a sleeve concentric with the drive collar and splined thereto but shiftable on the collar, splines on the free end of each clutch spring complementary to those on the sleeve so that when the sleeve is moved in either direction from its central or neutral position, its splines engage those on the respective clutch spring causing this spring to wind up and grip the drive collar and drive its respective pinion and the gear, and cam actuating means for shifting the drive sleeve into and out of splined engagement with the clutch springs.

16. In a clutch construction, a power drive shaft, opposed pinions rotatable on said shaft but adapted to be clutched thereto, a driven shaft having a gear mounted on and in meshing engagement with the pinions, a drive collar secured to the drive shaft between the opposed pinions, a coil clutch spring associated with each pinion and having an end anchored to the pinion and the other end free and encompassing the drive collar, a sleeve concentric with the drive collar and splined thereto but shiftable on the collar, splines on the free end of each clutch spring complementary to those on the sleeve so that when the sleeve is moved in either direction from its central or neutral position, its splines engage those on the respective clutch spring causing this spring to wind up and grip the drive collar and drive its respective pinion and the gear, a handle operated shifter shaft and cams slidable thereon provided with cam faces so contoured that rotation of the shifter shaft causes the cams to be shifted and control engagement between the drive sleeve and clutch springs.

17. In a clutch construction, a power drive shaft, opposed pinions rotatable on said shaft but adapted to be clutched thereto, a driven shaft having a gear secured thereon and in meshing engagement with the pinions, a drive collar secured to the drive shaft between the opposed pinions, a coil clutch spring associated with each pinion and having an end anchored to the pinion and the other end free and encompassing the drive collar, a sleeve concentric with the drive collar and splined thereto but shiftable on the collar, splines on the free end of each clutch spring complementary to those on the sleeve so that when the sleeve is moved in either direction from its central or neutral position, its splines engage those on the respective clutch spring causing this spring to wind up and grip the drive collar and drive its respective pinion and the gear, an enclosing sleeve for each clutch spring, a washer loose on each enclosing sleeve, a coil spring surrounding each enclosing sleeve and retained between an annular flange on this sleeve and the washer, a collar loose on each enclosing sleeve and abutting the drive sleeve, a handle operated shifter shaft having spaced pins, cams slidable on the shifter shaft having cam faces adapted to be engaged by the pins as the shifter shaft is rotated through a predetermined angle so as to vertically move the cams, and projections carried by the cams adapted to engage and move either of the washers to compress its associated coil spring and permit the other coil spring to force the drive sleeve into splined engagement with one of the clutch springs and drive the driven shaft in the desired direction.

18. A support for wringer having associated therewith indexing mechanism for locking the wringer in any desired position against swinging movement with respect to the washing machine, comprising a stationary substantially circular member having internal teeth, a horizontally disposed and slidably mounted retractable toothed segment and a spring adapted to move the segment into mesh with the teeth on the stationary member to retain the wringer in locked position, and means for separating the segment teeth from teeth on the stationary member to unlock the wringer whereby pressure on the wringer by an operator will result in swinging movement of the wringer relative to the support.

19. An indexing and locking mechanism for a wringer frame to facilitate swinging of a wringer relative to the frame and to maintain the wringer locked in any selected position, comprising a fixed circular member having internal teeth substantially throughout its circumference and a segmental member having teeth and means associated therewith for selectively engaging the teeth thereof with selected teeth of the circular member.

THOMAS R. SMITH.

CERTIFICATE OF CORRECTION.

Patent No. 2,377,819. June 5, 1945.

THOMAS R. SMITH.

It is hereby certified that error appears in the printed specification of the above numbered patent requiring correction as follows: Page 2, second column, line 1, strike out the words "its fingers 29, washer 31 and the lower coil spring" and insert instead --its neutral position shown in full outline in Fig. 2--; and that the said Letters Patent should be read with this correction therein that the same may conform to the record of the case in the Patent Office.

Signed and sealed this 18th day of September, A. D. 1945.

(Seal)

Leslie Frazer
First Assistant Commissioner of Patents.